(No Model.)

A. G. HOWLAND.
THILL COUPLING.

No. 497,919. Patented May 23, 1893.

Witnesses
Inventor
A. G. Howland
Attorneys

UNITED STATES PATENT OFFICE.

ABIEL GIFFORD HOWLAND, OF CHRISTCHURCH, NEW ZEALAND.

THILL-COUPLING.

SPECIFICATION forming part of Letters Patent No. 497,919, dated May 23, 1893.

Application filed January 7, 1893. Serial No. 457,677. (No model.)

*To all whom it may concern:*

Be it known that I, ABIEL GIFFORD HOWLAND, a subject of the Queen of Great Britain and Ireland, residing at Christchurch, in the Colony of New Zealand, have invented certain new and useful Thill-Couplings, of which the following is a specification.

The object of this invention is to provide a simple and effective coupling for the attachment and detachment of shafts or thills to vehicles, so as to hold the said shafts or thills in position without liability of becoming detached while the vehicle is in use; also to provide a device of the character referred to, which shall effectually prevent any rattle or noise incident to vibrations of the vehicle, substantially as will hereinafter more fully appear.

Figure 1:
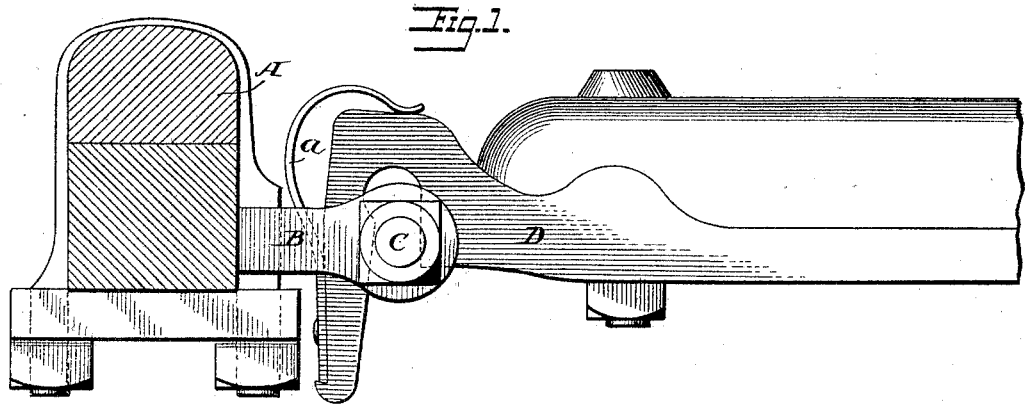
Figure 2:
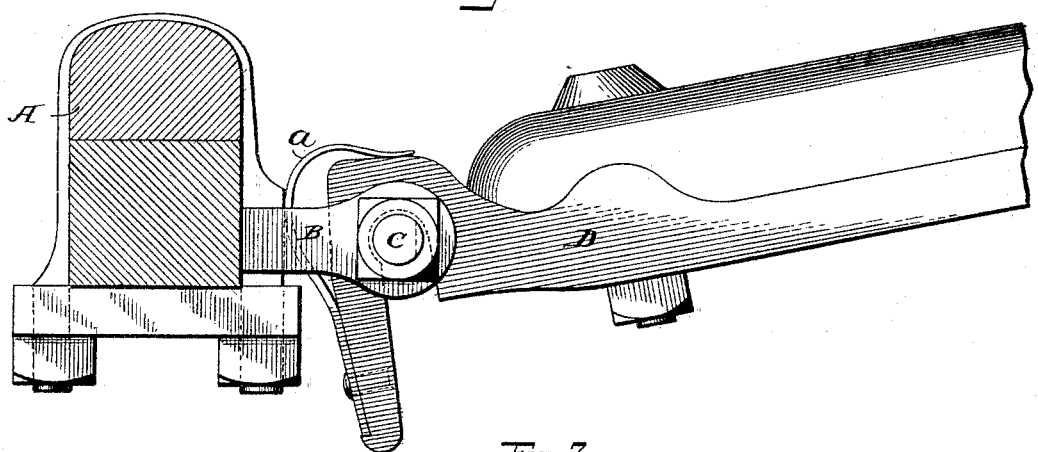
Figure 3:
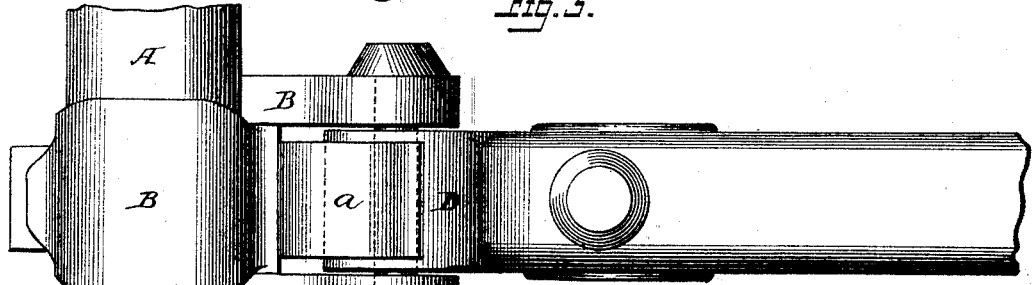
Figures 4, 5:
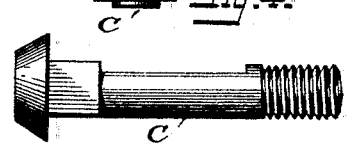

Referring to the drawings which form a part of this specification, Figure 1 is side view showing the eccentric shaft end iron in the position for dropping into the coupling. Fig. 2 is a side view showing the position of eccentric shaft end iron when properly coupled ready for use. Fig. 3 is a top view of same. Figs. 4 and 5 are respectively an elevation and plan of the coupling bolt, hereinafter referred to.

Similar letters refer to similar parts throughout the several views.

A is the axle bed of the vehicle.

B is the coupling, C the coupling bolt which is square under the head to prevent turning round, and having a "flat" surface formed on front side extending the width of the opening between the jaws of coupling (see Figs. 4 and 5).

D is the improved eccentric shaft end iron as attached to shaft, the outer end forming a hook having an eccentric slot; to the outside of this hook a spring *a* is secured by a rivet or other equivalent, the bottom edge of such spring fitting against a V shaped shoulder formed on said hook, while the upper end of spring rests on top side of said hook.

When coupling the shafts to the vehicle the point of the shafts are rested on the ground while the hooks of the iron D are dropped over the bolts C (as shown in Fig. 1), the "flat" surface on said bolts allowing the slots in the hooks to pass down until the bolts C fit into the eccentric hole at top of slot, when the shafts can be raised into position as shown in Fig 2 ready for use. When the shafts are thus raised the spring *a* is pressed against the front of couplings B, the hook of shaft end iron, being in such a position that the shafts cannot be lifted or driven out of the said couplings.

To detach the shafts the points must be dropped to the ground when the hooks of shaft and arms D can be lifted out of the couplings B, slightly pressing at the same time upon the cross bar.

When the shafts are in use the spring *a* pressing against the front of coupling B prevents any rattling noise occasioned by vibration.

The improved eccentric shaft and iron may be used with existing couplings by merely forming a flat surface on one side of screws as shown in Figs. 4 and 5.

Having now described my invention, what I claim as new, and desire to secure by Letters Patent, is—

In a thill coupling, the combination of the coupling having a bolt extending therethrough and formed with the flattened portion, the thill-iron having the hook fitting around said bolt and formed with the eccentric slot and the curved spring secured at its lower end to the inner face of the hook, the upper end of which spring being curved over to rest upon the upper surface of the hook, so as to bear between the hook and the axle-bed; substantially as shown and for the purpose described.

In testimony whereof I have signed my name to this specification in the presence of two subscribing witnesses.

ABIEL GIFFORD HOWLAND.

Witnesses:
  A. H. HART,
    *Christchurch, Patent Agent.*
  G. HART,
    *Christchurch, Clerk.*